United States Patent
Patel

(10) Patent No.: US 6,374,355 B1
(45) Date of Patent: *Apr. 16, 2002

(54) METHOD FOR SECURING OVER-THE-AIR COMMUNICATION IN A WIRELESS SYSTEM

(75) Inventor: Sarvar Patel, Montville, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,045

(22) Filed: Jul. 31, 1998

(51) Int. Cl.$^7$ .............................................. G06F 09/00
(52) U.S. Cl. ...................... 713/168; 380/247; 380/249
(58) Field of Search ................................ 380/247, 249; 713/168

(56) References Cited

U.S. PATENT DOCUMENTS

| | | | | |
|---|---|---|---|---|
| 5,799,084 A | * | 8/1998 | Gallagher et al. | 380/23 |
| 5,839,071 A | * | 11/1998 | Johnson | 455/440 |
| 6,061,791 A | * | 5/2000 | Moreau | 713/171 |
| 6,072,875 A | * | 6/2000 | Tsudik | 380/270 |

OTHER PUBLICATIONS

Menezes et al, Handbook of Applied Cryptography, Oct. 17, 1996, pp. 397–398, section 10.3.1.*
M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, IEEE computer society symposium on research in security and privacy, 72–84 May 1992.
R. Bird, I. Gopal, A. Herzberg, P. Janson, S. Kutten, R. Molva, and M. Yung, Systematic design of two–party authentication protocols, *Advances in Cryptololgy—Crypto*, 1991.

M. Blum and S. Micali, How to generate cryptographically strong sequences of pseudo random bits, *SIAM J. Computing*, 13 No. 4:850–864, 1984.

R. B. Boppana and R. Hirschfeld, Pseudorrandom generators and complexity classes, *Advances in Computing Research*, 5 (S. Micali, Ed.), JAI Press, CT.

U.S. Department of Commerce/N.I.S.T., *Digital Signature Standard*, FIPS 186, May 1994.

(List continued on next page.)

*Primary Examiner*—Thomas R. Peeso
(74) *Attorney, Agent, or Firm*—Birch Stewart Kolasch & Birch

(57) ABSTRACT

In the method for securing over-the-air communication in wireless system, a mobile sends a system access request and dummy data associated with the system access request to a network. The network sends a first data stream including a first data portion to the mobile in response to the system access request and the dummy data. The mobile extracts the first data portion from the first bit stream, and sends a second bit stream to the network. The second bit stream includes a second data portion. The mobile and the network both generate a key based on the first data portion and the second data portion, and establish a first encrypted and authenticated communication channel in cooperation using the key. The mobile then transfers authorizing information to the network over the first encrypted and authenticated communication channel. If accepted, a second encrypted and authenticated communication channel is established. The network then sends sensitive information such as the root or A-key to the mobile over the second encrypted and authenticated communication channel.

28 Claims, 1 Drawing Sheet

OTHER PUBLICATIONS

O. Goldreich and L. A. Levin, A hard–core predicate for all one way functions, Proceedings of the $21^{st}$ STOC, 25–32, 1989.

S. Goldwasser and A. Micali, Probabilistic encryption, *Journal of Computer and Systems Science*, 28: 270–299, 1984.

L. Gong, T. Lomas, R. Needham and J. Saltzer, Protecting poorly chosen secrets from guessing attacks, *IEEE Journal on Selected Areas in Communications* 11(5): 648–656, Jun. 1993.

EIA/TIA, Cellular Radio Telecommunications Intersystem Operations IS–41 Rev. D, 1997.

T. Lomas, L. Gong, J. Saltzer and R. Needham, Reducing Risks from Poorly Chosen Keys, Proceedings of the $12^{th}$ ACM Symposium on Operating System Principles, ACM Operating Systems Review,23(5): 14–18 Dec. 1989.

S. Patel, Information Leakage in Encrypted Key Exchange, Proceedings of DIMACS workshop on Network Threats, 38: 33–40, Dec. 1996.

S. Patel, Number theoretic attacks on secure passord schemes, IEEE symposium on security and privacy, 236–247, May 1997.

S. Patel, Weaknesses of the north american wireless authentication protocol, *IEEE Personal Communications*, 40–44, Jun. 1997.

A. C. Yao, Theory and application of trapdoor functions, Proceedings of $23^{rd}$ FOCS, 80–91, 1982.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, IEEE symposium on security and privacy, May 1998.

TIA/EIA Interim Standard, Over–the Air Service Provisioning of Mobile Stations in Spread Spectrum Systems, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97 , 1997.

Oded Goldreich, Shafi Goldwasser, Silvio Micalie, How to Construct Random Functions, Journal of the Association for Computing Machinery, vol. 33, No. 4, pp. 792–807, Oct. 1986.

* cited by examiner

METHOD FOR SECURING OVER-THE-AIR COMMUNICATION IN A WIRELESS SYSTEM

RELATED APPLICATIONS

The following applications, filed concurrently with the subject application, are related to the subject application and are hereby incorporated by reference in their entirety: application no. unknown entitled METHOD FOR TWO PARTY AUTHENTICATION AND KEY AGREEMENT by the inventor of the subject application; application Ser. No. 09/127,767 entitled METHOD FOR UPDATING SECRET SHARED DATA IN A WIRELESS COMMUNICATION SYSTEM by the inventor of the subject application; application Ser. No. 09/127,766 entitled METHOD FOR TRANSFERRING SENSITIVE INFORMATION USING INTIALLY UNSECURED COMMUNICATION by the inventor of the subject application; and application Ser. No. 09/127,769 entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

BACKGROUND OF THE INVENTION

1. Field of the Invention

The present invention relates to a method for securing over-the-air communication in a wireless system.

2. Description of Related Art

In a wireless communication system, the handsets, often called mobiles, purchased by mobile users are typically taken to a network service provider, and long keys and parameters are entered into the handset to activate service. The network of the service provider also maintains and associates with the mobile, a copy of the long keys and parameters for the mobile. As is well-known, based on these long keys and parameters, information can be securely transferred between the network and the mobile over the air.

Alternatively, the user receives long keys from the service provider over a secure communication channel, like a telephone/land line, and must manually enter these codes into the mobile.

Because the transfer of the long keys and parameters is performed via a telephone/land line or at the network service provider as opposed to over the air, the transfer is secure against over the air attacks. However, this method of securely transferring information places certain burdens and restrictions on the mobile user. Preferably, the mobile user should be able to buy their handsets and then get service from any service provider without physically taking the handsets to the provider's location or having to manually, and error free, enter long keys into the mobile. The capability to activate and provision the mobile remotely is part of the North American wireless standards, and is referred to as "over the air service provisioning" (OTASP).

Currently, the North American Cellular standard IS41-C specifies an OTASP protocol using the well-known Diffe-Hellman (DH) key protocol for establishing a secret key between two parties. FIG. 1 illustrates the application of the DH key agreement to establishing a secret key between a mobile 20 and a network 10 used in IS41-C. Namely, FIG. 1 shows, in a simplified form for clarity, the communication between a network 10 and a mobile 20 according to the DH key agreement. As used herein, the term network refers to the authentication centers, home location registers, visiting location registers, mobile switching centers, and base stations operated by a network service provider.

The network 10 generates a random number $R_N$, and calculates ($g^{R_N}$ mod p). As shown in FIG. 1, the network 10 sends a 512-bit prime number p, a generator g of the group generated by the prime number p, and ($g^{R_N}$ mod p) to the mobile 20. Next, the mobile 20 generates a random number $R_M$, calculates ($g^{R_M}$ mod p), and sends ($g^{R_M}$ mod p) to the network 10.

The mobile 20 raises the received ($g^{R_N}$ mod p) from the network 10 to the power $R_M$ to obtain ($g^{R_M R_N}$ mod p). The network 10 raises the received ($g^{R_M}$ mod p) from the mobile 20 to the power $R_N$ to also obtain ($g^{R_M R_N}$ mod p). Both the mobile 20 and the network 10 obtain the same result, and establish the 64 least significant bits as the long-lived or root key called the A-key. The A-key serves as a root key for deriving other keys used in securing the communication between the mobile 20 and the network 10.

One of the problems with the DH key exchange is that it is unauthenticated and susceptible to a man-in-the-middle attack. For instance, in the above mobile-network two party example, an attacker can impersonate the network 10 and then in turn impersonate the mobile 20 to the network 10. This way the attacker can select and know the A-key as it relays messages between the mobile 20 and the network 10 to satisfy the authorization requirements. The DH key exchange is also susceptible to off-line dictionary attacks.

SUMMARY OF THE INVENTION

The method for securing over-the-air communication in wireless system according to the present invention disguises an OTASP call as a normal system access to defeat attacks. According to the present invention, a mobile sends a system access request and dummy data associated with the system access request to a network. The network sends a first data stream including a first data portion to the mobile in response to the system access request and the dummy data. The mobile extracts the first data portion from the first bit stream, and sends a second bit stream, which includes a second data portion, to the network. The network extracts the second data portion from the second data stream.

Both the mobile and the network generate a key based on the first data portion and the second data portion, and establish a first encrypted and authenticated communication channel using the key. The mobile then transfers authorizing information to the network over the first encrypted and authenticated communication channel. If accepted, a second encrypted and authenticated communication channel is established. Over the second encrypted and authenticated communication channel, the network then sends sensitive information such as the root or A-key to the mobile.

An attacker monitoring the communication between the mobile and network according to the present invention would recognize the communication as a normal system access, and presumably fail to mount an attack. However, if an attack is mounted, an attacker must block a significant number of system accesses to find a disguised OTASP call. This denial of service to mobile users makes locating and stopping an attacker fairly easy.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein.

DETAILED DESCRIPTION OF THE PREFERRED EMBODIMENTS

The system and method according to the present invention protects the over-the-air transfer of information between the mobile 20 and the network 10 by disguising the transfer as a normal system access. For the purposes of discussion only, the system and method according to the present invention will be described with respect to the transfer of the A-key by disguising the transfer as a call origination system access.

Figure 1:
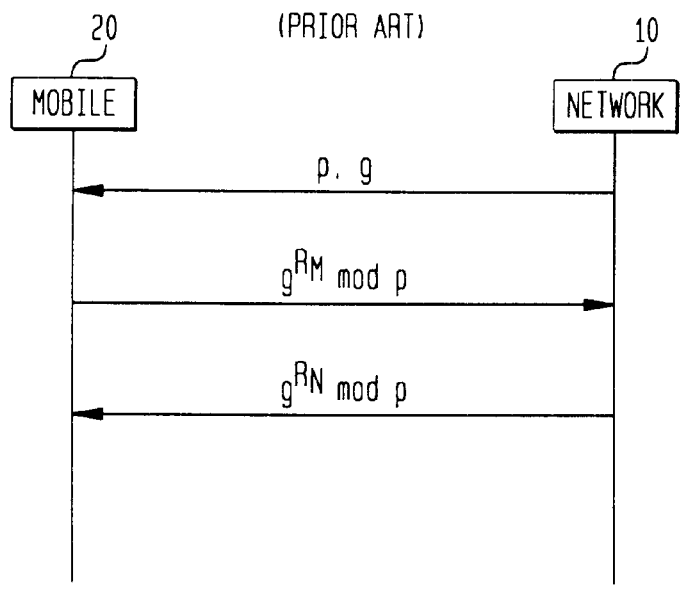
FIG. 1 shows the communication between a network and a mobile according to the Diffe-Hellman key agreement.
Figure 2:
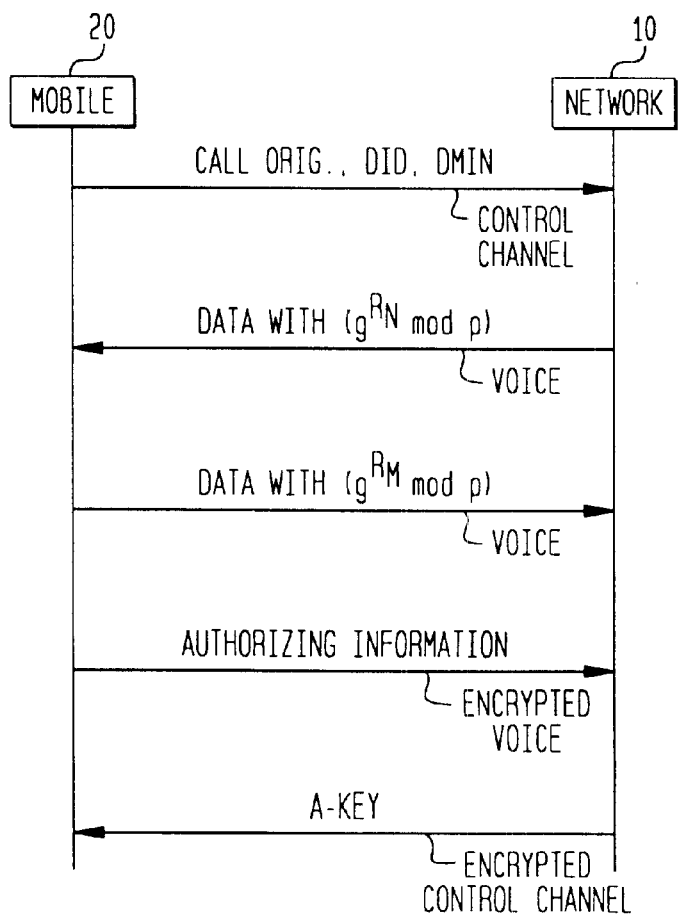
FIG. 2 shows the communication between a network and a mobile user according to an embodiment of the present invention.

As discussed previously, during service provisioning, the mobile 20 and the network 10 need to establish an A-key for future encrypted communication. According to the present invention, during this initialization process, such as when the mobile 20 is first activated, the mobile 20 generates a random number DID as a dummy identification number for the mobile 20, and generates another random number DMIN as a dummy telephone number for the mobile 20. The mobile 20 then sends a call origination request, the dummy identification number DID and the dummy telephone number DMIN to the network 10 over an access channel as shown in FIG. 2. FIG. 2 shows the communication between the network 10 and a mobile 20 according to an embodiment of the present invention.

Because the dummy identification number DID and the dummy telephone number DMIN are dummy values, the network 10 fails to recognize the dummy identification number DID and the dummy telephone number DMIN as legitimate numbers. Such a situation could result due to error, or because the mobile 20 is trying to establish a disguised OTASP. The network 10 continues to "pretend" the call is normal by sending a first bit stream over a voice channel to the mobile 20. The first bit stream may be a predetermined and pre-stored bit stream or a randomly generated bit stream, but is indistinguishable from the bit stream of an encrypted voice channel. However, the network 10 sends ($g^{R_N}$ mod p) at a first predetermined position, which is pre-stored by both the mobile 20 and the network 10, in the first bit stream.

The mobile 20 extracts ($g^{R_N}$ mod p) from the first bit stream, and generates a random number RM. The mobile 20 calculates ($g^{R_M}$ mod p), and further calculates ($g^{R_N}$ mod $p)^{R_M}$, which equals ($g^{R_N R_M}$ mod p). The mobile 20 selects ($g^{R_N R_M}$ mod p), a hash thereof, or a portion thereof as the session key SK. The mobile 20 also sends a second bit stream over the voice channel to the network 10. The second bit stream may be a predetermined and pre-stored bit stream or a randomly generated bit stream, but is indistinguishable from the bit stream of an encrypted voice channel. However, the mobile sends ($g^{R_M}$ mod p) at a second predetermined position, which is pre-stored by both the mobile 20 and the network 10, in the second bit stream. The first and second predetermined position can be the same or different positions.

The network 10 extracts ($g^{R_M}$ mod p) from the second bit stream, and calculates ($g^{R_M}$mod $p)^{R_N}$, which equals ($g^{R_N R_M}$ mod p). The network 10 selects ($g^{R_N R_M}$ mod p), a hash thereof or a portion thereof, in the same manner as did the mobile 20, as the session key SK. Accordingly, the network 10 and the mobile 20 have established the same session key SK.

Next, after a predetermined period of time (e.g., ten seconds), communication between the mobile 20 and the network 10 over the voice channel is encrypted using the session key SK as a root key (A-key) according to any well-known protocol such as IS41-C. Furthermore, the voice channel is message authenticated using any well-known message authentication algorithm such as the HMAC algorithm.

The mobile user then supplies the network 10 with authorizing information (e.g., credit card number for billing purposes, etc.) over the encrypted and authenticated voice channel. Once the authorizing information has been verified by the network 10, the network 10 sends the A-key to the mobile 20 over a control channel, which is encrypted and authenticated in the same manner as the voice channel.

After the encrypted and authenticated transfer of the A-key is complete, the network 10 and the mobile 20 reconfigure communication based on the A-key.

Preferably, the protocol used for encryption, such as the IS41-C protocol, is modified to perform authentication as disclosed in one of two concurrently filed applications by the same inventor entitled METHOD FOR TWO PARTY AUTHENTICATION and METHOD FOR PROTECTING TRANSFER OF INFORMATION OVER AN UNSECURED COMMUNICATION CHANNEL. The concurrently filed applications entitled METHOD FOR TWO PARTY AUTHENTICATION and METHOD FOR PROTECTING TRANSFER OF INFORMATION OVER AN UNSECURED COMMUNICATION CHANNEL, by the Inventor are hereby incorporated by reference in their entirety.

An attacker monitoring the communication between the mobile 20 and the network 10 would recognize the call origination request, and subsequently believe that a call was taking place based on the data transfer over the voice channel. Because the first and second bit streams do not convey recognizable voice information, an attacker must assume that the voice channel is encrypted. However, not until a predetermined period of time after the network 10 generates the session key SK does the voice channel become encrypted.

The only way for the attacker to act as a man-in-the-middle is to do so with most of the on-going calls, and hope that one of the calls is the above-described OTASP call. To have any significant probability of finding an OTASP call, the attacker will have to block most of the calls because an OTASP call is a rare event. Call origination, however, is very frequent. Consequently, if the attacker is blocking most calls, causing a denial of service, it becomes easier to find the attacker. It also becomes more important to find the source of the attack, and restore service to the mobile users.

The embodiment of the present invention discussed above assumes the mobile 20 and the network 10 each store a predetermined prime number p and a predetermined generator g of p. As an alternative, the prime number p and the generator g are safely sent to one of the parties from the other party using any well-known technique for safely sending a prime number p and the generator g thereof.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method for securing over-the-air communication with a network, comprising (a) sending a disguised service provisioning request to a network;

(b) receiving a first bit stream from said network in response to said step (a), said first bit stream including a first data portion;

(c) extracting said first data portion from said first bit stream;

(d) sending a second bit stream to said network, said second bit stream including a second data portion;

(e) generating a key based on said extracted first data portion and said second data portion; and (f) establishing a first encrypted communication channel using said key.

2. The method of claim 1, wherein said step (c) extracts said first data portion from a first predetermined position in said first bit stream.

3. The method of claim 1, wherein said step (d) sends said second data portion at a first predetermined position in said second bit stream.

4. The method of claim 1, wherein said first data portion represents ($g^{R_N}$ mod p), where p is a prime number, g is the generator of a group generated by said prime number p and $R_N$ is a first random number; and said second data portion represents ($g^{R_M}$ mod p), where $R_M$ is a second random number.

5. The method of claim 4, wherein said step (e) generates said key as ($g^{R_N R_M}$ mod p).

6. The method of claim 1, wherein said step (f) establishes said first encrypted communication channel as an encrypted and authenticated communication channel using said key.

7. The method of claim 1, further comprising:

(g) establishing a second encrypted communication channel using said key; and (h) transferring authorizing information to said network over said second encrypted communication channel; and wherein said step (f) is performed after said step (h) if said network accepts said authorizing information.

8. The method of claim 7, wherein said step (f) establishes said first encrypted communication channel as an encrypted and authenticated communication channel using said key; and said step (g) establishes said second encrypted communication channel as an encrypted and authenticated communication channel using said key.

9. The method of claim 7, wherein said second encrypted communication channel is a voice channel.

10. The method of claim 1, further comprising:

(g) receiving sensitive information from said network over said first encrypted communication channel.

11. The method of claim 10, wherein said sensitive information is a root key.

12. The method of claim 1, wherein said step (a) sends dummy data with a non-service provioning system access request as said disguised service provisioning request.

13. The method of claim 12, wherein said step (a) sends a call origination request as said non-service provisioning system access request.

14. The method of claim 1, wherein said first and second data portions are the only information used from the first and second bit streams, respectively.

15. A method for securing over-the-air communication with a mobile, comprising:

(a) recognizing receipt of a disguised service provisioning request from said mobile as a service provisioning request;

(b) sending a first bit stream including a first data portion to said mobile in response to said step (a);

(c) receiving a second bit stream from said mobile, said second bit stream including a second data portion;

(d) extracting said second data portion from said second bit stream;

(e) generating a key based on said extracted second data portion and said first data portion; and (f) establishing a first encrypted communication channel using said key.

16. The method of claim 15, wherein said step (d) extracts said second data portion from a first predetermined position in said second bit stream.

17. The method of claim 15, wherein said step (b) sends said first data portion at a first predetermined position in said first bit stream.

18. The method of claim 15, wherein said first data portion represents ($g^{R_N}$ mod p), where p is a prime number, g is the generator of a group separated by said prime number p and $R_N$ is a first random number; and said second data portion represents ($g^{R_M}$ mod p), where $R_M$ is a second random number.

19. The method of claim 18, wherein said step (e) generates said key as ($g^{R_N R_M}$ mod p).

20. The method of claim 15, wherein said step (f) establishes said first encrypted communication channel as an encrypted and authenticated communication channel.

21. The method of claim 15, further comprising:

(g) establishing a second encrypted communication channel using said key; and (h) receiving authorizing information from said mobile over said second encrypted communication channel; and wherein said step (f) establishes said first encrypted communication channel if said authorizing information is acceptable.

22. The method of claim 21, wherein said step (f) establishes said first encrypted communication channel as an encrypted and authenticated communication channel using said key; and said step (g) establishes said second encrypted communication channel as an encrypted and authenticated communication channel using said key.

23. The method of claim 21, wherein said second encrypted communication channel is a voice channel.

24. The method of claim 15, further comprising:

(g) sending sensitive information to said mobile over said first encrypted communication channel.

25. The method of claim 24, wherein said sensitive information is a root key.

26. The method of claim 15, wherein said step (a) recognizes receipt of dummy data with a non-service provisioning system access request as said disguised service provisioning request.

27. The method of claim 26, wherein said step (a) receives a call origination request as said non-service provisioning system access request.

28. The method of claim 15, wherein said first and second data portions are the only information used from the first and second bit streams, respectively.

* * * * *